United States Patent [19]

Aoyama

[11] Patent Number: 5,285,929
[45] Date of Patent: Feb. 15, 1994

[54] PARTS FEEDING AND RECEIVING MECHANISM

[76] Inventor: Yoshitaka Aoyama, 20-11, Mikitsukadai 2-cho, Sakai-shi, Osaka 590-01, Japan

[21] Appl. No.: 861,049

[22] Filed: Apr. 1, 1992

[30] Foreign Application Priority Data

Apr. 13, 1991 [JP] Japan ............................ 3-171592

[51] Int. Cl.$^5$ .............................................. B65H 3/16
[52] U.S. Cl. .................................. 221/212; 221/165; 221/238
[58] Field of Search ............... 221/212, 156, 165, 161, 221/311, 224, 238

[56] References Cited

U.S. PATENT DOCUMENTS

| | | | |
|---|---|---|---|
| 3,494,393 | 2/1970 | Casanov | 221/212 X |
| 5,007,795 | 4/1991 | Yoshimura | 221/212 X |
| 5,044,519 | 9/1991 | Aoyama | 221/212 |

FOREIGN PATENT DOCUMENTS 8812234 11/1988 Fed. Rep. of Germany .
1181622 7/1989 Japan .

Primary Examiner—D. Glenn Dayoan
Assistant Examiner—Dean A. Reichard
Attorney, Agent, or Firm—Pollock, Vande Sande & Priddy

[57] ABSTRACT

It is an object to provide an arrangement wherein a parts feeding member and a parts receiving member are provided each with a magnet, characterized in that the front end of a part is prevented from being magnetized to preclude magnetic repulsion problems in the feeding and receiving of parts.

The polarity of the magnet associated with the feeding member is selected to control the magnetic lines so that they pass through only a portion of the part.

3 Claims, 2 Drawing Sheets

# PARTS FEEDING AND RECEIVING MECHANISM

BACKGROUND OF THE INVENTION

1. Field of Invention

This invention relates to a parts feeding and receiving mechanism of the type in which a parts feeding member and a parts receiving member are provided each with a magnet.

2. Description of Prior Art

As far as my research covers, there has been found no known example in which a parts feeding member and a parts receiving member are provided each with a magnet. However, among what I have proposed, there is one shown in FIG. 6. The part handled therein is an iron bolt 1 having a flange-like head 2 and a stem 3. A feeding member 4 is adapted to be moved vertically and horizontally, and a parts receiving member 5 is adapted to be moved vertically. The front end of the feeding member 4 is formed with a notch 6, in which a magnet 7 for holding a part is installed. The magnet 7 is embedded in the feeding member 4 and has a protective plate 8 mounted thereon. The head 2 is attracted by the magnet 7 with its end surface contacting the protective plate 8. The feeding member 4 is connected to driving means (not shown) so that it is movable horizontally and vertically as indicated by arrows 9, 10, 11 and 12.

On the other hand, the receiving member 5 has a receiving hole 13 for the stem 3 and has a magnet 14 fixed in the innermost region of said receiving hole. The receiving member 5 receives the bolt 1 and then moves downward to feed the bolt to an intended place. Therefore, the receiving member 5 also is capable of reciprocating as indicated by arrows 11 and 12.

The operation of the feeding and receiving mechanism described above will now be described. The feeding member 4 holding the bolt 1 by the magnet 7 is moved from the left as indicated by the arrow 9 and is stopped when the stem 3 is coaxial with the receiving hole 13. Then the feeding member 4 is moved upward as indicated by the arrow 11 to insert the stem 3 into the receiving hole 13, where it is attracted by the magnet 14. Thereafter, when the feeding member 4 is retracted as indicated by the arrow 12, the bolt 1 remains in the receiving hole 13 under the attractive force of the magnet 14. After the feeding member 4 is retracted in the direction of arrow 10, the receiving member 5 starts to descend.

With the mechanism thus arranged, if the polarity of the magnet associated with the feeding member and the polarity of the magnet associated with the receiving member are not properly selected, the proper feeding and receiving of parts is impossible. To describe this in more detail, if the N-pole of the magnet 7 is directed upward and its S-pole downward, then the magnetic lines 15 pass through the bolt 1 longitudinally thereof, so that the front end of the stem 3 has an N-pole. If the polarity of the magnet 14 is such that its lower side is N and upper side is S, then the front end of the stem 3 and the magnet 14 repulse each other. This means that when the feeding member 4 descends in the direction of arrow 12, the bolt returns as it adheres to the protective plate 8 rather than remaining in the receiving hole 13; thus, the feeding and receiving operation becomes impossible.

Such problems could be solved by selecting the polarity of the magnet 14 such that it corresponds to the polarity of the magnet 7 so that it is in the attracting relation rather than the repulsing relation. However, when such magnets are so installed, mistakes can be made, resulting in the repulsing relation.

SUMMARY OF THE INVENTION

The present invention has been accomplished to solve the problems described above. The invention as claimed in claim 1 is a parts feeding and receiving mechanism wherein a parts feeding member and a parts receiving member are provided each with a magnet, characterized in that the magnetic lines of the magnet for the parts feeding member pass concentratedly through the portion of a part disposed closer to the feeding member. Such magnetic line disposition prevents the front end of a part from being magnetized, allowing it to be reliably attracted by the associated magnet. In the invention as claimed in claim 2, the arrangement is such that the magnetic lines of the magnet for the feeding member extend along the contact surface of the part. Thus, the magnetic lines pass through only a portion of the part. In claim 3, a yoke is combined with a magnet to specify the phenomenon of passage of magnetic lines, thereby causing the magnetic lines to pass only a portion of the part.

DESCRIPTION OF THE PREFERRED EMBODIMENTS

Figure 1:
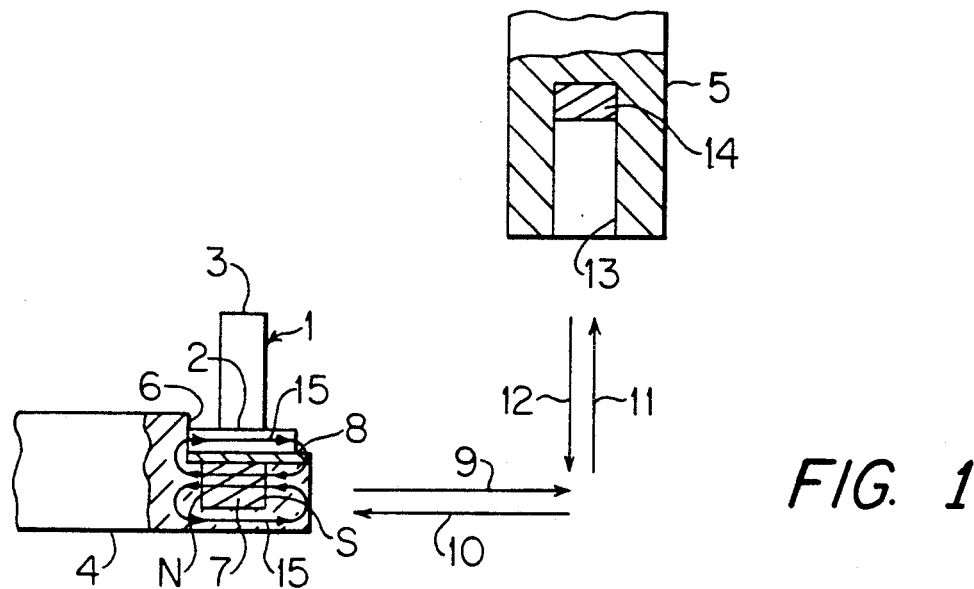
FIG. 1 is a side view in longitudinal section of the present inventive mechanism.
Figure 6:
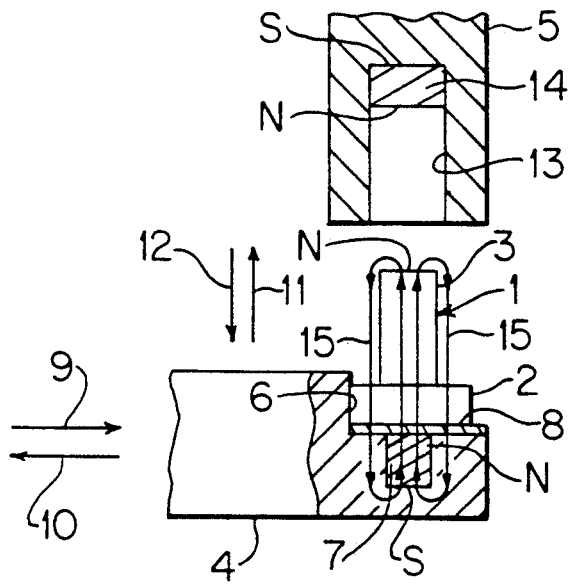
FIG. 6 is a side view in longitudinal section showing a prior art example.

In the prior art design of FIG. 6 the magnetic lines of the magnet 7 pass concentratedly through the portion of the part disposed closer to the feeding member 4 (diametrically of the head 2). By arranging the N- and S-poles horizontally as shown in FIG. 1, the magnetic lines 15 pass through the head 2 alone, as shown, so that the stem 3 itself and its front end do not have magnetism and hence the polarity as shown in FIG. 6 no longer appears. Such disposition of the magnet 7 allows the polarity of the magnet 14 associated with the receiving member 5 to be freely selected, so that the problem of repulsion caused by mistakes in mounting, as described above, is eliminated. In addition, in order to enable the magnetic forces of the two magnets 7 and 14 to act accurately on the bolt 1, the two members 4 and 5 and protective plate 8 should properly be made of stainless steel.

Figure 2:
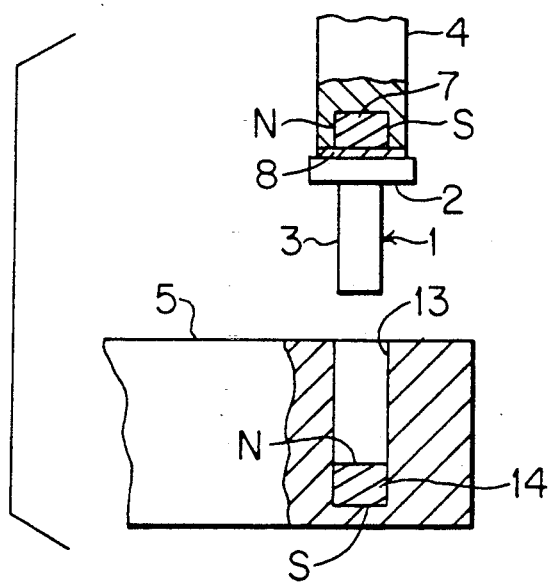
FIG. 2 is a side view in longitudinal section, showing another embodiment.

In the embodiment shown in FIG. 2, the vertical positional relation between the two members 4 and 5 is reversed and the polarity of the magnet 7 is as shown, whereby the magnetic lines extend along the contact surface of the part (head 2) in exactly the same manner as in FIG. 1. Thus, the front end of the stem 3 is not magnetized at all.

Figure 3:
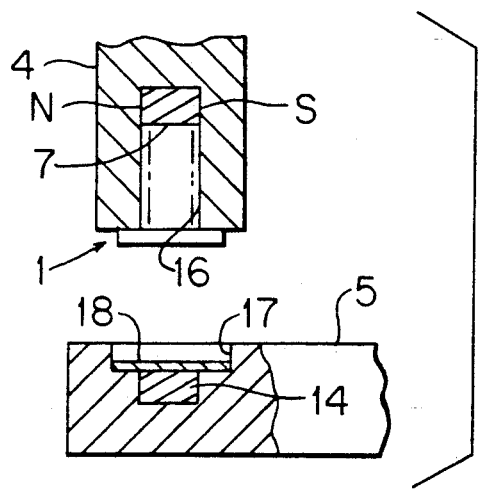
FIG. 3 is a side view in longitudinal section, showing another embodiment.

In the embodiment shown in FIG. 3, the feeding member 4 is formed with a parts receiving hole 16, with the magnet 7 disposed in the innermost region thereof, the N- and S-poles being horizontally disposed. The receiving member 5 is formed with a recess 17 and the magnet 14 is embedded therein and has a protective plate 18 attached thereto.

Figure 4:
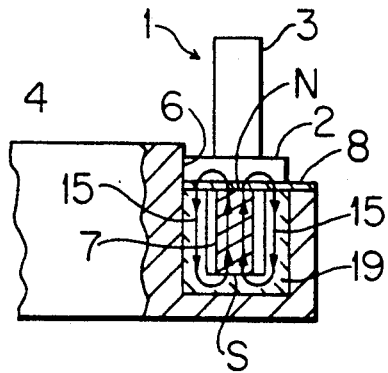
FIG. 4 is a side view in longitudinal section, showing another embodiment.

In the embodiment shown in FIG. 4, the N- and S-poles are vertically disposed, but by providing a yoke 19, the magnetic lines 15 pass through only a portion of the head 2, so that the stem 3 is not magnetized.

Figure 5:
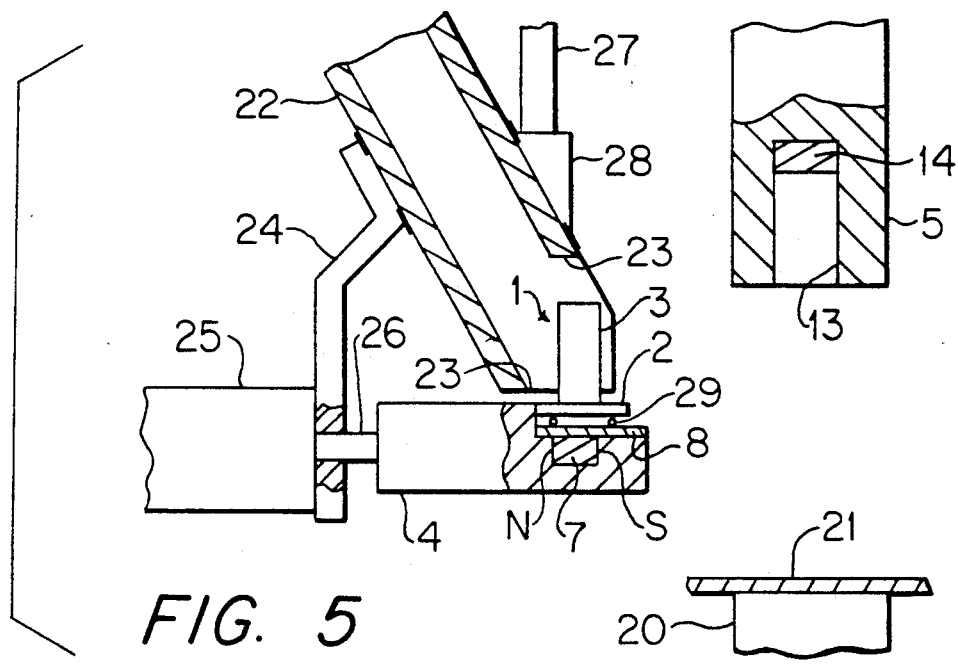
FIG. 5 is a side view in longitudinal section of a welding device.

The device shown in FIG. 5 is a projection welding device having the parts feeding and receiving mechanism of the present invention applied thereto. The receiving member 5 is a movable electrode and a fixed electrode 20 is disposed in opposed relation thereto, with a steel plate part 21 mounted thereon. The lower end of a parts feeding tube 22 is formed with an opening 23 associated with the magnet 7 attached to the feeding member 4. An air cylinder 25 is fixed to a bracket 24 welded to said tube 22, and its piston rod 26 is connected to the feeding member 4. Therefore, the air cylinder 25 is moved in the directions of arrows 9 and 10. On the other hand, another air cylinder (not shown) is connected to a stationary member and its piston rod 27 is connected to the parts feeding tube 22 through a bracket 28, whereby it is moved as indicated by the arrows 11 and 12. In addition, the head 2 is shaped like a flange having welding projections 29 formed thereon.

According to the present invention, since the front end of the stem of the part held by the feeding member is not magnetized, there is no danger of repulsion irrespective of the state of the polarity of the magnet associated with the receiving member, so that smooth and reliable feeding and receiving of parts can be attained.

What is claimed is:

1. A parts delivery system for fasteners having coaxial proximal and distal portions, the system comprising:
   a feeding member having a single first magnet mounted thereto for securing a fastener and transporting it to a receiving member;
   a receiving member having a single second magnet mounted thereto for securely receiving the fastener from the feeding member;
   the magnets being stationarily mounted in relative coaxial relation to the fastener when the fastener is mounted to a corresponding portion;
   the lines of magnetic force from the first magnet flowing, in a concentrated manner, through the proximal portion of the fastener.

2. The system set forth in claim 1 wherein the poles of the first magnet are arranged perpendicular to the axis of the fastener for directing the lines of force across a surface of the proximal portion which contacts the feeding member.

3. The system set forth in claim 1 wherein the poles of the first magnet are arranged coaxial to the fastener and further wherein a metallic yoke embraces the first magnet thereby diverting the lines of force therethrough, to ensure concentration of magnetic force lines through the proximal fastener portion which contacts the feeding member.

* * * * *